United States Patent [19]

Lato

[11] Patent Number: 4,545,789
[45] Date of Patent: Oct. 8, 1985

[54] REMOVAL OF ORGANIC RESIDUE FROM FIBER MIST ELIMINATOR

[75] Inventor: Stephen M. Lato, Baton Rouge, La.

[73] Assignee: Stauffer Chemical Company, Westport, Conn.

[21] Appl. No.: 720,056

[22] Filed: Apr. 8, 1985

Related U.S. Application Data

[63] Continuation of Ser. No. 605,522, Apr. 30, 1984, abandoned.

[51] Int. Cl.$^4$ ............................................... B01D 37/00
[52] U.S. Cl. .......................................... 55/71; 55/96; 423/500
[58] Field of Search ...................... 55/30, 71, 96, 242, 55/DIG. 36; 423/500

[56] References Cited

U.S. PATENT DOCUMENTS

| | | | |
|---|---|---|---|
| 3,403,498 | 10/1968 | Pasha | 55/90 |
| 3,835,136 | 9/1974 | Hirdler et al. | 423/500 X |
| 4,138,559 | 2/1979 | Fullington et al. | 423/500 X |
| 4,227,890 | 10/1980 | Wood et al. | 55/30 |
| 4,363,642 | 12/1982 | Stahl | 55/242 X |

*Primary Examiner*—Charles Hart
*Attorney, Agent, or Firm*—Richard P. Fennelly

[57] ABSTRACT

The organic material fouling fiber mist eliminator elements used in the chemical process industry (e.g., to filter chlorine gas in the production of chlorine) is removed by treating the fouled element with a heated, dilute aqueous caustic solution.

4 Claims, No Drawings

REMOVAL OF ORGANIC RESIDUE FROM FIBER MIST ELIMINATOR

BACKGROUND OF THE PRESENT INVENTION

This is a continuation of application Ser. No. 605,522 filed Apr. 30, 1984 now abandoned.

Fiber mist eliminators are used in the chemical process industry to remove mists from process gases. Some representative publications which describe such apparatus and their use are the following which are incorporated herein by reference: Chemical Engineering Progress, Vol. 60, No. 11, pages 68-73 (November 1964); Chemical Process Industries, Third Edition, page 341; Chemical Engineers' Handbook, Fifth Edition, pages 18-88 to 18-91; and Kirk-Othmer Encyclopedia of Chemical Technology, Vol. 1, pages 694-696 (1978).

There have been certain suggestions made in the literature for cleaning such filter elements. For example, U.S. Pat. No. 4,120,671 to D. E. Steinmeyer advocates use of a hot water/detergent solution/water rinse sequence to clean a filter used to clean smoke emissions from a restaurant char broiler. U.S. Pat. No. 4,363,642 to L. E. Stahl also advocates use of a detergent solution to clean a fiber bed-type mist eliminating apparatus in a restaurant meat broiling range. U.S. Pat. No. 3,763,631 to E. A. Horn et al. advocates use of a solution of water and certain surface active agents or surfactants to clean filter media containing ink mists in the vicinity of high speed printing presses. U.S. Pat. No. 4,003,726 R. Dale Huillet et al. advocates cleaning of fiber bed mist eliminator elements, that have been used to filter combustion flue gases, with a hot acidified potassium permanganate solution followed by treatment of the elements with gaseous sulfur dioxide.

The removal of organic material, e.g., chlorinated organics, from such filter elements arising from the filtration of gas streams in the chemical process industry is a significant problem. Often, new elements have been purchased at a significant cost. The literature gives little guidance in regard to cleaning such organic residue from the elements. In the above-described Kirk-Othmer Encyclopedia reference it is stated (at page 695) that suitable cleaning procedures have "included steaming, detergent water washing, solvent cleaning, and ultrasonic cleaning using a variety of fluids".

DESCRIPTION OF THE PRESENT INVENTION

The present invention is particularly directed to the cleaning of organic residue from the fiber mist eliminator elements used to remove mist impurities from gas streams. The particular cleaning solution which has been found useful is a dilute, heated aqueous caustic solution. The process is particularly useful in the removal of chlorinated organic residue from the filter elements used in the filtration of chlorine gas.

More particularly, as further illustrated in the Example attached hereto, chlorinated organic residue was substantially removed from the fiber mist eliminator elements by treating them with a hot (55° C.-60° C.) dilute (0.01-10 wt. %) aqueous solution of caustic. The term "caustic" as used herein is intended to encompass alkali metal hydroxides such as sodium hydroxide, potassium hydroxide, and the like.

The caustic solution, for example, in one preferred embodiment was heated in a suitable tank by a steam eductor having its suction and discharge in the tank. The hot, dilute caustic solution was then pumped by a small centrifugal pump through appropriate piping to the top of a recirculation pipe holding the element to be cleaned with provision made to recirculate the solution for additional cleaning of the element after it had treated the element. The hot solution was thus circulated (e.g., at about 20 gal/min) for a sufficient length of time (e.g., 15-30 min.) so that it had extracted a major part of the organic substance. A total of 300-600 gallons of cleaning solution were used per element. The now dirty solution was then drained into a storage vessel, and the cleaned element was rinsed with water and removed.

The present invention is further illustrated by the Example which follows.

EXAMPLE

An element from a fiber bed mist filtration unit (also termed "wet" Brinks element) used in filtering chlorine gas to remove entrained water and other impurities, was found to have accumulated thereon a chlorinated organic substance. The substance had the appearance and feel of fresh putty. It had an odor similar to that of linseed oil. When exposed to an open flame, the material burned vigorously with a bright yellow to white flame with white sparks popping out from the substance. The flame became extinguished as soon as the flame was removed.

Various solvents were tried in accordance with the procedure described before in an attempt to either dissolve or breakup the organic material with the following results:

| Solvent Tried | Results |
| --- | --- |
| Acids of Various Strengths: | |
| $H_2SO_4$ (98%, 10%, Normal) HCl (15 N, 1 N, 0.1 N) Nitric (10%) | Little or no effect. |
| Organic Solvents: | |
| Carbon Tetrachloride/ Acetone | The material dissolved slowly-the solvents are incompatible with the plastic cage supporting the fiber bed element. |
| Boiling Water | The material softened, bubbles formed within it, the material deposited against the walls of the beaker holding the element and water. |
| 20% Caustic (NaOH) | Charred the exterior of the material-did not remove it. |
| 10% Caustic | Somewhat effective above 50° C. |
| 5% Caustic | Good results at temperatures above 50° C. |
| 1% Caustic | Dissolved or reacted with material at temperatures above 50° C. |
| 0.1% Caustic | Same results as 1% caustic solution. |
| 0.05% Caustic | Not as effective as 1% but still somewhat effective. |

It was judged from the foregoing that the plastic cage supporting the fiber bed filter element had a temperature limit of about 66° C. in the weak caustic solutions tested.

Before treatment of the filter elements as described above, the pressure drop through the fiber bed mist filtration unit was in the neighborhood of 12.24 in. of water at a plant operating at a load of 200 KA. After treatment with a 60° C. weak (0.5%) caustic solution the pressure drop had decreased significantly to 4.08 in. of water after the plant had been on line at 200 KA. At least 95% of the organic substance had been removed.

The fiber bed mist filtration unit which was cleaned had been installed after a secondary chlorine cooler and before an acid drying train in the plant. It comprised a reinforced plastic cage formed of ATLAC 382 polyester resin which held a fiber packing element formed of spun glass material. The elements were cylindrical and were about 16.5 in. in diameter and were about 12.25 in. in height.

The foregoing should be construed as describing certain elements of the present invention that may be preferred embodiments thereof. The foregoing is intended to be illustrative only and should not be used to restrict the scope of protection to be accorded the inventor. The scope of protection desired is set forth in the claims which follow.

What is claimed is:

1. A method of removing chlorinated organic material fouling fiber mist eliminator elements used in the filtering of a gas stream in the chemical process industry which comprises treating the fouled elements after removal from its position of filtering the gas stream with a heated, dilute aqueous caustic solution consisting essentially of water and alkali metal hydroxide to remove the chlorinated organic material said dilute caustic solution is at a temperature of from 50° C. to about 66° C. and has a strength of from about 0.01% to about 10%.

2. A method as claimed in claim 1 wherein the caustic solution is at a temperature of 55° C. to 60° C.

3. A method as claimed in claim 1 wherein about 300 to about 600 gallons of caustic solution is used per element.

4. A method as claimed in claim 1 wherein the element had been used to filter chlorine gas during chlorine production.

* * * * *